J. Ryder,
Stump Elevator.
Nº 85,135. Patented Dec. 22, 1868.
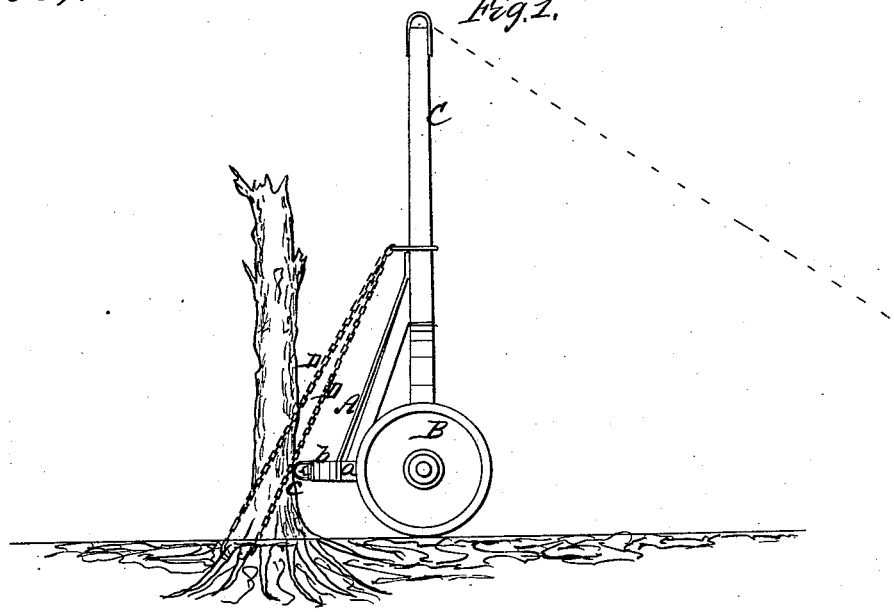
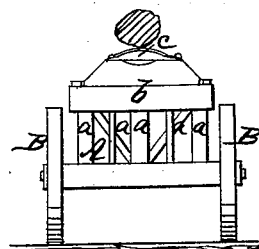
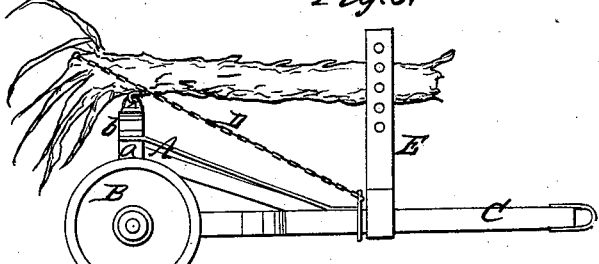
Witnesses
Wm A Morgan
G. C. Cotton
Inventor
J. Ryder
per Munn & Co
Attorneys

JESSE RYDER, OF SING SING, NEW YORK.

Letters Patent No. 85,135, dated December 22, 1868.

IMPROVED DEVICE FOR EXTRACTING AND TRANSPORTING TREES.

The Schedule referred to in these Letters Patent and making part of the same.

*To all whom it may concern:*

Be it known that I, JESSE RYDER, of Sing Sing, in the county of Westchester, and State of New York, have invented a new and improved Device for Taking up Trees; and I do hereby declare that the following is a full, clear, and exact description thereof, which will enable others skilled in the art to make and use the same, reference being had to the accompanying drawings, forming a part of this specification.

This invention relates to a new and improved device for taking up trees, with a view of transplanting them, and is more especially designed to facilitate the transplanting of large trees.

The invention consists of a cart, so constructed that its tongue or draught-pole may be elevated to a vertical position, and the top of the rear end of the cart-body, or frame, placed in contact with the body of the tree to be raised, so that the team may be attached to the draught-pole, and the latter made to serve the office of a lever in drawing out the tree, chains or ropes being attached to the roots of the tree, so that, as the draught-pole is drawn down by the team, the tree will be drawn out of the ground, and made to rest upon the body or frame of the cart. A standard is fitted on the draught-pole, after the tree is raised, in order to support the front part, or the top of the same, and keep it elevated above the backs of the team.

In the accompanying sheet of drawings—

Figure 1 is a side view of my invention.

Figure 2, a rear view of the same.

Figure 3, a side view of the same.

Similar letters of reference indicate corresponding parts.

A represents the frame of the cart, which is mounted on two wheels, B B, and has a draught-pole, C, attached, with a horizontal bar, or beam, b, on their upper ends, a cushion, c, being secured to the upper surface of b, to prevent the tree being abraded when being raised or lifted.

D D represent two chains or ropes, which are attached to the rear part of the draught-pole, and are provided with hooks at their ends to admit of their being attached to the roots of the tree to be raised.

The draught-pole of the cart is raised to a vertical position, and the cart adjusted so that the cushion c will be in contact with the body of the tree.

The ground is more or less excavated around the base of the tree, to a suitable depth, and more especially at the side of the tree opposite to that against which the cart is backed, so as to admit of the chains D D being fastened to the root at that side of the tree. (See fig. 1.) The team is then attached to the upper end of the draught-pole, and the latter drawn down, and the tree drawn down, the draught-pole and frame of the cart serving as a lever, and the axles of the cart serving as the fulcrum thereof. The tree, as it is raised, assumes a horizontal position, and the frame rests upon the latter, and when the draught-pole is fully down, a standard, E, is fitted upon the draught-pole, to which the front or upper part of the tree is lashed, in order to keep it above and free from the backs of the team. (See fig. 3.)

The tree is drawn to the spot where it is to be transplanted, and adjusted in the hole designed to receive it, by unhooking the chains D D, and raising the draught-pole.

Having thus described my invention,

I claim as new, and desire to secure by Letters Patent—

1. The device for taking up trees, consisting of the frame A, mounted upon wheels B, the axle of which supports the cushioned beam b, and receives the lever draught-pole C, to which the adjustable bar E is attached, all arranged as described, for the purpose specified.

2. The cushion c, and adjustable bar E, in combination with the beam b, and lever C, as herein described, for the purpose specified.

The above specification of my invention signed by me, this 30th day of April, 1868.

JESSE RYDER.

Witnesses:
J. ALISON FRASER,
ALEX. F. ROBERTS.